(No Model.)

J. LINTON & J. BURGHER.
LEVEL.

No. 602,137. Patented Apr. 12, 1898.

Witnesses
Walter S. Wood
D. Eldred Wood

Inventors
John Linton and
John Burgher
By Fred L. Chappell
Attorney.

UNITED STATES PATENT OFFICE.

JOHN LINTON AND JOHN BURGHER, OF HOMER, MICHIGAN.

LEVEL.

SPECIFICATION forming part of Letters Patent No. 602,137, dated April 12, 1898.

Application filed November 23, 1896. Serial No. 613,100. (No model.)

*To all whom it may concern:*

Be it known that we, JOHN LINTON and JOHN BURGHER, citizens of the United States, residing at the village of Homer, in the county of Calhoun and State of Michigan, have invented certain new and useful Improvements in Levels, of which the following is a specification.

Our invention relates to improvements in gravity-levels, or levels of the spirit variety.

The objects of our invention are, first, to provide a level which is simple and easy to manufacture; second, to provide a level which can also be made use of as an inclinometer, showing the exact inclination on a graduated scale of the surface to which it may be applied. A further object is to provide an efficient receptacle for the fluid used in the same. Still further objects will appear in the detailed description. We accomplish these objects of our invention by the devices and means described in the following specification and illustrated in the accompanying drawings, in which—

Figure 1:
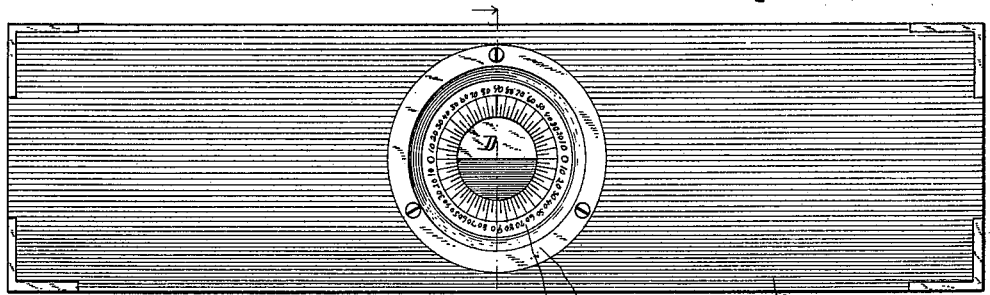
Figure 2:
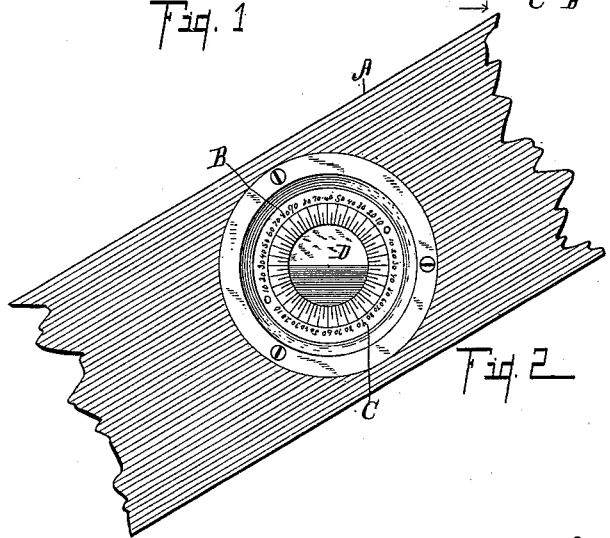
Figure 3:
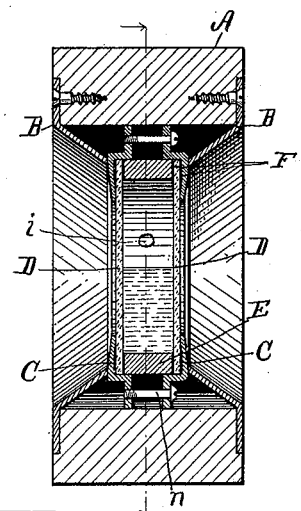
Figure 4:
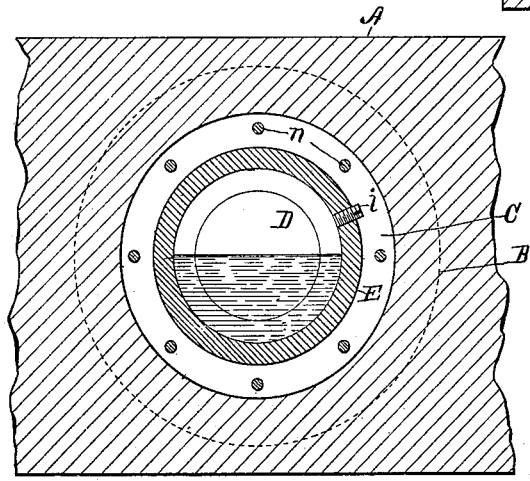

Figure 1 is a side elevation of a level embodying the features of our invention. Fig. 2 is a detailed elevation of the same, showing the level on an incline and the method of operation. Fig. 3 is an enlarged detail transverse sectional view on line 3 3 of Fig. 1. Fig. 4 is also an enlarged detailed sectional view on line 4 4 of Fig. 3.

In the drawings similar letters of reference refer to similar parts throughout the several views, and all of the sectional views are taken looking in the direction of the little arrows at the ends of the section-lines.

Referring to the lettered parts of the drawings, A represents the block of the level, which has the usual straight edge for leveling purposes. At the center of this block is a circular receptacle having glass or transparent sides, through which the contained liquid can be observed. Any liquid can be employed in the receptacle, but liquid mercury might be preferred. The receptacle is made up by a ring E, with the glass disks B to each side of the same, with a gasket F between. Outside of the glass disks are secured the metallic rings C, which extend inwardly and are graduated into a scale circular measure, so that the angle or pitch can be read from this scale or the exact level be determined where that is the object desired. The gaskets F are to each side of the glass plates, and the outer rings C are drawn together by suitable screws $n$. A suitable screw-plug $i$ is passed through the wall for the purpose of introducing the level liquid. The scales to each side are exactly concentric with the circle of the central casing. The liquid should fill the central casing, leaving it just one-half full, or up to the center. The plates B are open to the center and clamp the receptacles between them and are secured to the block at each side by suitable screws.

It will be readily seen that by turning the level or placing it on any surface the exact angle of the surface can be determined and whether it be level or not. It will also be very clear that lines at an angle of ninety degrees to the surface or the plumb-line can be easily determined with this instrument. We are aware that annular chambers have been formed; but no level has been made using a circular chamber in this form, and this is of immense advantage, owing to the fact that the user of the article has a complete straight line of the liquid from which to determine the actual level, whereas with an annular chamber there are two separate points which must be determined by some other means, and an accurate reading is thus prevented without elaborate and expensive instruments being utilized to determine the same. Almost any mobile liquid could be utilized in our improved level. We desire to state that while the details of the construction of our improved receptacle in this connection we believe to be the best possible that we are aware of, other constructions might be adopted and the structure of our device be considerably varied without departing from the broad features of our invention.

Having thus described our invention, what we claim as new, and desire to secure by Letters Patent, is—

In a level, the combination of a suitable block A having straight edge; a receptacle supported within said block consisting of oppositely-situated transparent sides; a ring E, between the same, with gaskets F at each side; rings C, C, to each side of the same having marked thereon a suitable scale retained and clamped upon the glass by suitable screws $n$, and supporting rings B, B, let into each side of the block to engage the central receptacle and hold it in a fixed position, all co-acting together substantially as described for the purpose specified.

In witness whereof we have hereunto set our hands and seals in the presence of two witnesses.

JOHN LINTON. [L. S.]
JOHN BURGHER. [L. S.]

Witnesses:
MYRON H. NICHOLS,
JOHN JACKSON.